United States Patent

Santoli et al.

[11] Patent Number: 5,463,853
[45] Date of Patent: Nov. 7, 1995

[54] LAWNMOWER WITH ADJUSTABLE SIDE CUTTERS

[76] Inventors: Domenico Santoli, 2 Clark Pl., W. Harrison, N.Y. 10604; George Spector, 233 Broadway Rm 702, New York, N.Y. 10279

[21] Appl. No.: 293,448

[22] Filed: Aug. 22, 1994

[51] Int. Cl.⁶ .............................. A01D 34/66; A01D 34/86
[52] U.S. Cl. ................ 56/6; 56/13.5; 56/DIG. 10; 280/32.7
[58] Field of Search .................... 56/6, 13.5, 13.6, 56/14.7, 15.8, 32.3, DIG. 10; 280/32.7

[56] References Cited

U.S. PATENT DOCUMENTS

| | | | |
|---|---|---|---|
| 4,192,525 | 3/1980 | Clark | 280/32.7 X |
| 4,429,515 | 2/1984 | Davis, Jr. et al. | 56/6 |
| 5,004,251 | 4/1991 | Velke et al. | 56/DIG. 9 X |
| 5,223,817 | 8/1993 | Nicol | 56/14.7 X |
| 5,249,411 | 10/1993 | Hake | 56/13.5 X |

FOREIGN PATENT DOCUMENTS 638436  4/1962  Italy ........................................ 280/32.7

*Primary Examiner*—David J. Bagnell

[57] ABSTRACT

An improved industrial lawn mower is provided, which consists of a frame having a main cutting unit with large wheels connected to the frame and small wheels connected to the main cutting unit. A pair of auxiliary cutting units are provided, with each having small wheels and extending from an opposite side of the main cutting unit in the frame, to increase the cutting area. A seat assembly having a small wheel extends from the rear of the frame. An engine is in the frame, to supply motive power to the large wheels, the main cutting unit in the frame and the auxiliary cutting units.

1 Claim, 1 Drawing Sheet

LAWNMOWER WITH ADJUSTABLE SIDE CUTTERS

BACKGROUND OF THE INVENTION

The instant invention relates generally to mowing vehicles and more specifically it relates to an improved industrial lawn mower, which provides two side cutting units to increase its cutting area. There are available various conventional mowing vehicles which do not provide the novel improvements of the invention herein disclosed.

SUMMARY OF THE INVENTION

A primary object of the present invention is to provide an improved industrial lawn mower that will overcome the shortcomings of the prior art devices.

Another object is to provide an improved industrial lawn mower that includes two auxiliary cutting units, each extending from an opposite side of the main cutting unit to increase the cutting area of the lawn mower.

An additional object is to provide an improved industrial lawn mower, in which the two side cutting units and the seat assembly can fold up for storage and to fit through narrow passages.

A further object is to provide an improved industrial lawn mower that is simple and easy to use.

A still further object is to provide an improved industrial lawn mower that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
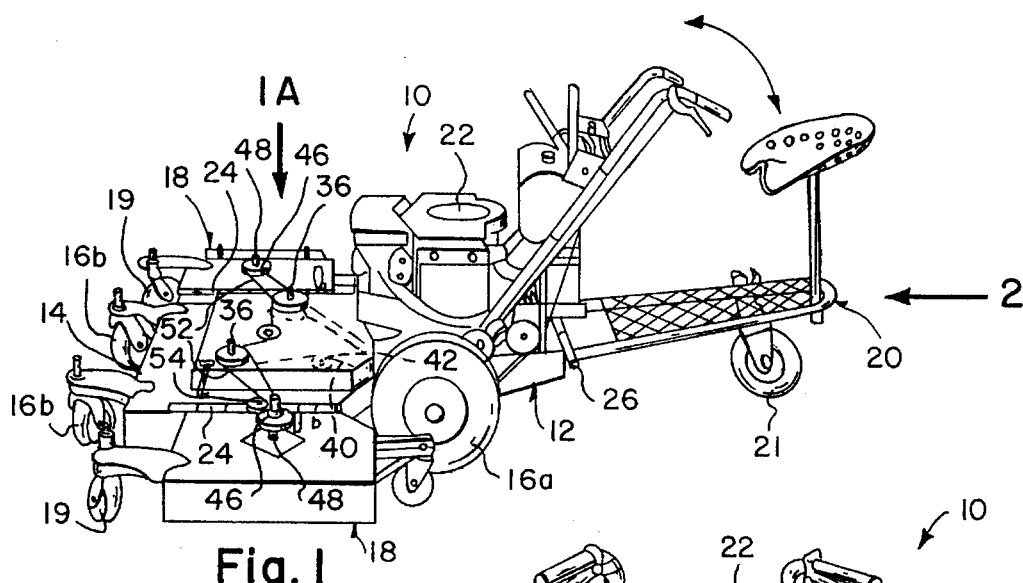
FIG. 1 is a side perspective view of the invention showing fold up movement of the seat assembly.
Figure 2:
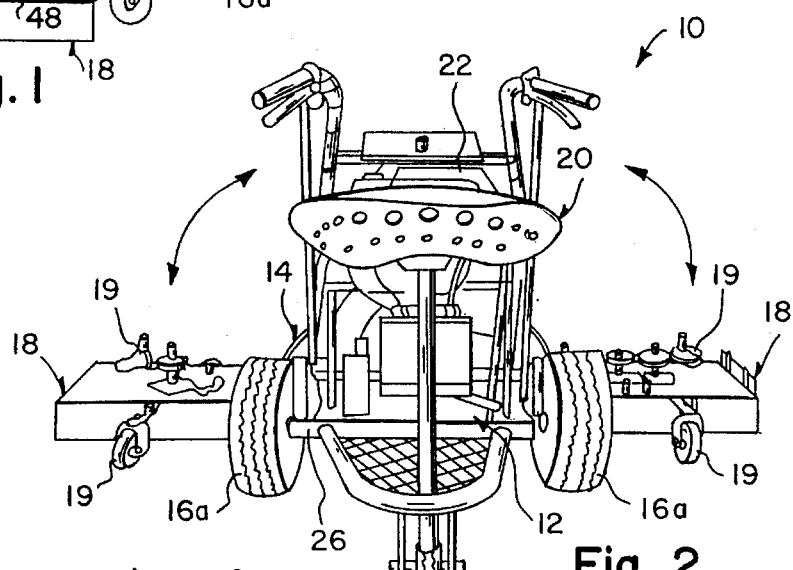
FIG. 2 is a rear perspective view taken in the direction of arrow 2 in FIG. 1, showing fold up movement of the two auxiliary cutting units.
Figures 1A, 3, 4:
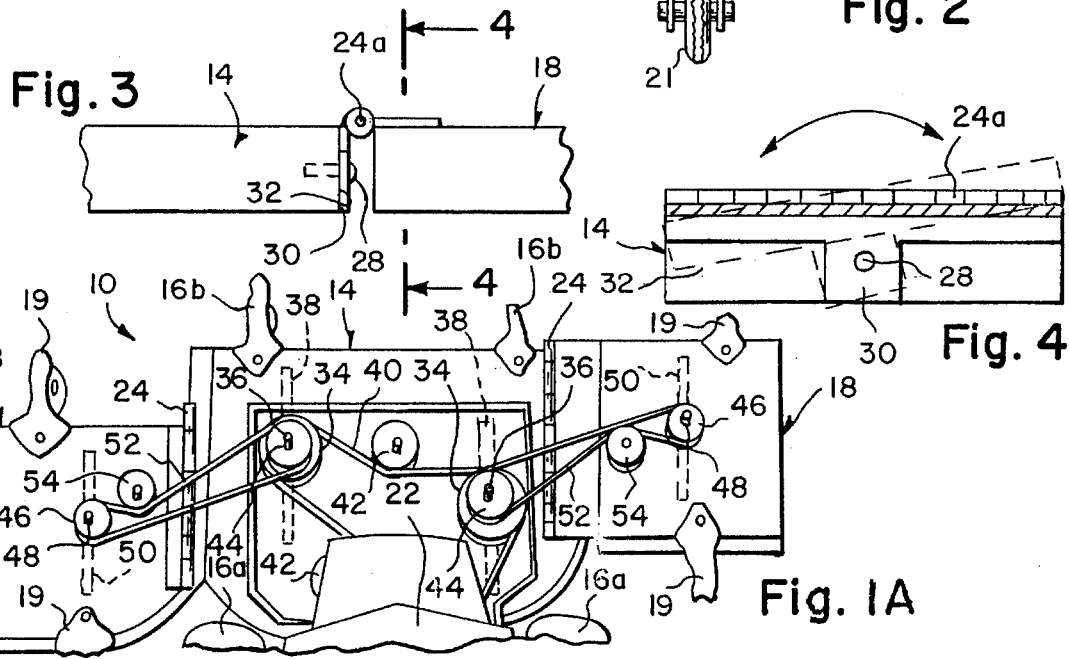
FIG. 1A is a top perspective view taken in the direction of arrow 1A in FIG. 1, showing the bolts and pulleys for operating the cutting blades within the main cutting unit and the auxiliary cutting units.
FIG. 3 is a diagrammatic side view with parts broken away of a modification, in which the auxiliary cutting units can also pivot over irregular terrain.
FIG. 4 is a diagrammatic cross sectional view taken along line 4—4 in FIG. 3, showing the pivotal movement of the auxiliary cutting unit hinge in phantom.

Turning now descriptively to the drawings, in which similar reference characters denote similar elements throughout the several views, FIGS. 1, 1A and 2 illustrate an improved industrial lawn mower 10, which consists of a frame 12 having a main cutting unit 14 with large wheels 16a connected to the frame 12 and small wheels 16b connected to the main cutting unit 14. A pair of auxiliary cutting units 18 are provided, with each having small wheels 19 and extending from an opposite side of the main cutting unit 14 in the frame 12, to increase the cutting area. A seat assembly 20, having a small wheel 21, extends from the rear of the frame 12. An engine 22 is in the frame 12, to supply motive power to the large wheels 16a, the main cutting unit 14 in the frame 12 and the auxiliary cutting units 18.

A pair of auxiliary cutting unit hinges 24 are provided, with each mounted between one side of the main cutting unit 14 in the frame 12 and one auxiliary cutting unit 18. The auxiliary cutting units 18 can fold up for storage and to pass through narrow passages.

A seat assembly hinge 26 is located between a rear side of the frame 12 and a front side of the seat assembly 20, so that the seat assembly 20 can fold up for storage.

As shown in FIGS. 3 and 4, each modified auxiliary cutting unit hinge 24a can include a pivot pin 28 extending through the center of a leaf 30 and the side 32 of the main cutting unit 14. The auxiliary cutting unit 18 can now pivot over irregular terrain.

FIGS. 1 and 1A show two main pulleys 34 on two main shafts 36, with two main cutting blades 38 in the main cutting unit 14. A main belt 40 driven by the engine 22 extends about the two main pulleys 34 and engages two main idler pulleys 42 to take up the slack. Two additional main pulleys 44 are on the two main shafts 36. Each auxiliary cutting unit 18 has an auxiliary pulley 46 on an auxiliary shaft 48 with an auxiliary cutting blade 50. An auxiliary belt 52 extends about each additional main pulley 44 and auxiliary pulley 46. An auxiliary idler pulley 54 engages each auxiliary belt 52 to take up the slack. When the engine 22 drives the main belt 40 the auxiliary belts 52 will also be drive, so that the main cutting blades 38 and the auxiliary cutting blades 50 will operate to cut grass.

OPERATION OF THE INVENTION

To use the improved industrial lawn mower 10, a person simply sits on the seat assembly 20 and operates the main cutting unit 14 and the auxiliary cutting units 18 therefrom. When placed in storage, the auxiliary cutting units 18 can be folded up by the auxiliary cutting unit hinges 24 and the seat assembly hinge 26. Each modified auxiliary cutting unit hinge 24a, as shown in FIGS. 3 and 4, allows each auxiliary cutting unit 18 to pivot over the irregular terrain.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved industrial lawn mower which comprises:
   a) a frame having a main cutting unit with large wheels connected to said frame and small wheels connected to said main cutting unit;
   b) a pair of auxiliary cutting units, each having small wheels and extending from an opposite side of the main cutting unit in said frame to increase the cutting area;
   c) a seat assembly having a small wheel and extending from the rear of said frame; and
   d) an engine in said frame to supply motive power to said large wheels, said main cutting unit in said frame and said auxiliary cutting units; further including a pair of auxiliary cutting unit hinges, each is mounted between one side of the main cutting unit in said frame and one said auxiliary cutting unit, so that said auxiliary cutting units can fold up for storage and to pass through narrow passages; further including a seat assembly hinge located between a rear side of said frame and a front side of said seat assembly, so that said seat assembly can fold up for storage; wherein each said auxiliary cutting unit hinge includes a pivot pin extending through the center of a leaf and the side of the main cutting unit, so that said auxiliary cutting unit can pivot over irregular terrain.

* * * * *